(12) United States Patent
Williams (10) Patent No.: US 8,651,505 B2
(45) Date of Patent: Feb. 18, 2014

(54) BICYCLE

(75) Inventor: Marty Williams, Colorado Springs, CO (US)

(73) Assignee: Marty Williams, Colorado Springs, CO (US)

( * ) Notice: Subject to any disclaimer, the term of this patent is extended or adjusted under 35 U.S.C. 154(b) by 110 days.

(21) Appl. No.: 12/779,931

(22) Filed: May 13, 2010

(65) Prior Publication Data

US 2010/0289246 A1    Nov. 18, 2010

Related U.S. Application Data

(60) Provisional application No. 61/177,731, filed on May 13, 2009.

(51) Int. Cl.
*B60K 13/00* (2006.01)

(52) U.S. Cl.
USPC .......................... 280/274; 280/259; 280/281.1

(58) Field of Classification Search
USPC ................................ 280/259, 282, 274, 281.1
See application file for complete search history.

(56) References Cited

U.S. PATENT DOCUMENTS

| | | | | | |
|---|---|---|---|---|---|
| 3,854,754 | A | * | 12/1974 | Jablonski | 280/242.1 |
| 4,046,396 | A | | 9/1977 | Taylor | |
| 4,248,448 | A | * | 2/1981 | Dmitrowsky | 280/261 |
| 4,411,443 | A | * | 10/1983 | Pollard | 280/288.1 |
| 4,647,060 | A | * | 3/1987 | Tomkinson | 280/288.1 |
| 4,798,395 | A | * | 1/1989 | Shaffer et al. | 280/240 |
| 5,240,268 | A | * | 8/1993 | Allsop et al. | 280/281.1 |
| 5,271,635 | A | * | 12/1993 | Lu | 280/275 |
| 5,356,165 | A | | 10/1994 | Kulhawik et al. | |
| 5,403,027 | A | * | 4/1995 | Hwang | 280/261 |
| 5,611,557 | A | * | 3/1997 | Farris et al. | 280/275 |
| 5,887,882 | A | * | 3/1999 | Atchison | 280/288.1 |
| 5,915,710 | A | * | 6/1999 | Miller | 280/252 |
| 6,036,210 | A | * | 3/2000 | Lee | 280/250 |
| 6,050,584 | A | * | 4/2000 | Sibson | 280/283 |
| 6,070,894 | A | * | 6/2000 | Augspurger | 280/249 |
| 6,073,949 | A | * | 6/2000 | O'Hare et al. | 280/283 |
| 6,086,079 | A | * | 7/2000 | Farina | 280/261 |
| 6,131,934 | A | * | 10/2000 | Sinclair | 280/284 |
| D439,206 | S | * | 3/2001 | Torres | D12/111 |
| 6,199,884 | B1 | * | 3/2001 | Doroftei | 280/252 |
| 6,712,737 | B1 | * | 3/2004 | Nusbaum | 482/8 |
| 7,311,362 | B2 | * | 12/2007 | Gaffney | 297/488 |
| 2010/0013185 | A1 | * | 1/2010 | Hotoda | 280/259 |
| 2010/0062909 | A1 | * | 3/2010 | Hamilton | 482/61 |

FOREIGN PATENT DOCUMENTS

| | | |
|---|---|---|
| JP | 2000-142516 A | 5/2000 |
| WO | 2005-082700 A1 | 9/2005 |

\* cited by examiner

*Primary Examiner* — Kevin Hurley
*Assistant Examiner* — Michael Stabley
(74) *Attorney, Agent, or Firm* — Tracy M. Heims; Apex Juris, pllc (57) ABSTRACT

A bicycle 10 providing increased power transfer and improved aerodynamic characteristics. The bicycle includes a seat assembly 70 that supports the anterior pelvic region so the rider extends forwardly over the bicycle instead of in an upright position. The bicycle also includes a rear mounted drive assembly 80 to increase the power transfer from the rider.

23 Claims, 7 Drawing Sheets

BICYCLE

RELATED APPLICATIONS

This application claims the benefit of priority from provisional application 61/177,731, filed on May 13, 2009.

FIELD OF THE INVENTION

This invention relates to the field of bicycles and more particularly to the field of bicycles having a rear axle drive train.

BACKGROUND OF THE INVENTION

The design of bicycles has evolved little since their initial popularity dating back to the $19^{th}$ century. The standard bicycle design includes a frame having a front wheel, a rear wheel, bicycle seat mounted in between on the frame, a rear free wheel sprocket and a front sprocket with a bottom bracket supporting a crank onto which the drive pedals are mounted. While new technology has evolved in the frame materials, frame design, shifting and brake design, little has changed in the overall design of the bicycle.

Most bicycles require the rider to sit upright or crouched on the upright seat. This position creates significant wind drag with the rider in that position. While racers and other performance riders may crouch in order to lower that drag, the overall position still creates aerodynamic problems as well discomfort.

An additional problem with this position is that almost all of the power to drive the bicycle is created by the legs of the rider. During general usage, the rider places their gluteus maximus on the seat and solely powers the bicycle by their legs. The trunk and upper body of the rider is little used in these bicycles.

Another problem with the current design of bicycles occurs from the position of the rider. Many riders suffer from sitting upright or in a crouch on the bicycle. Discomfort from this position can arise as well as lower back pain and even numbness in the groin region. This discomfort arises from the rider having their weight centered on the saddle in an upright seated position. These saddles are typically narrow to minimize weight and increase aerodynamics and are by nature uncomfortable.

Riders often crouch over the handlebars to decrease the wind resistance to enhance performance. This position is uncomfortable and causes fatigue. Serious medical issues may arise from this position as well as the upright position, commonly known as bike seat neuropathy Recumbent bicycles have been developed to allow the rider to sit in a reclining position. However these types of bicycles are not suitable for performance or aerodynamics. The power stroke of the rider is limited to use of the legs of the rider only. Also, the position of the rider in an upright manner creates wind resistance as well.

Similar problems exist in the design of many exercise devices. Most stationary bicycles require the rider to sit in an upright position. This leads to numbing in the lower back and groin of the rider. This is further exacerbated by the lack of movement of the rider since the equipment is stationary. Also, only the lower body undergoes exercise.

Thus problems exist in the design of present bicycles and exercise equipment. The present bicycles do not provide an efficient design to lower wind resistance of the rider or to allow the rider to utilize more of the body in transferring power to the bicycle.

SUMMARY OF THE INVENTION

The present invention solves these and other problems by providing a design for supporting the rider and power transfer of the rider. Preferred embodiments of the present invention enables the rider to be supported in a profile to improve the aerodynamic characteristics of the rider. The power transfer of the rider is also greatly improved to allow the rider to increase the efficiency of their power stroke.

In a preferred embodiment of the present invention, a unique saddle assembly enables the rider to be supported in a forwardly extending position. This lowers the profile of the rider to be in a more aerodynamic position, reducing the turbulence around the rider.

The unique saddle assembly of a preferred embodiment of the present invention used in combination with a rear mounted bicycle drive assembly also provides a more efficient power transfer. The seat assembly supports the anterior pelvic region of the rider so the rider extends forwardly over the bicycle. The rear mounted drive assembly allows a fuller extension of the rider's body to transmit power not only from the legs of the rider but from the upper body and trunk of the rider as well.

A preferred embodiment of the present invention utilizes a saddle assembly on a bicycle that supports the anterior pelvic region of the rider. The saddle assembly includes two spaced pads that are adjustable to support the anterior pelvic region. The bicycle also includes a rear mounted drive assembly that supports the feet of the rider. This allows the rider to fully extend forwardly over the bicycle instead of in an upright position. This lowers the aerodynamic profile of the rider.

The rear mounted drive assembly of the above described embodiment in a preferred embodiment includes a rear wheel assembly having a crank extending through it. The crank includes pedals that are engaged by the feet of the rider. The rider is thus able to power the crank through a full body extension rather than just the legs of the prior bicycles.

A preferred embodiment of the present invention utilizes a chain drive that extends from one side of the crank to a spindle mounted in a bottom bracket of the bicycle. Another chain extends along the other side of the bicycle from the spindle back to a sprocket attached to the rear wheel of the bicycle. A plurality of chain rings and derailleur mechanism can be incorporated to provide a shifting mechanism as well.

Other embodiments of the present invention incorporate the saddle assembly and rear drive mechanism in exercise equipment. These can include a stationary bicycle as well as other types of exercise equipment.

The present invention may also be incorporated into other types of mechanisms where the rider is supported forwardly on their anterior pelvic region instead of their posterior. These mechanisms may include but are not limited to scooters, motorcycles and other devices.

These and other features of the present invention will be evident from the ensuring descriptions of embodiments and from the drawings.

DETAILED DESCRIPTION OF PREFERRED EMBODIMENTS

A preferred embodiment of the present invention is illustrated in FIGS. 1-12. It is to be expressly understood that the descriptive embodiment is provided herein for explanatory purposes only and is not meant to unduly limit the claimed inventions. Other embodiments of the present invention are considered to be within the scope of the claimed inventions, including not only those embodiments that would be within the scope of one skilled in the art, but also as encompassed in technology developed in the future.

Figure 1:
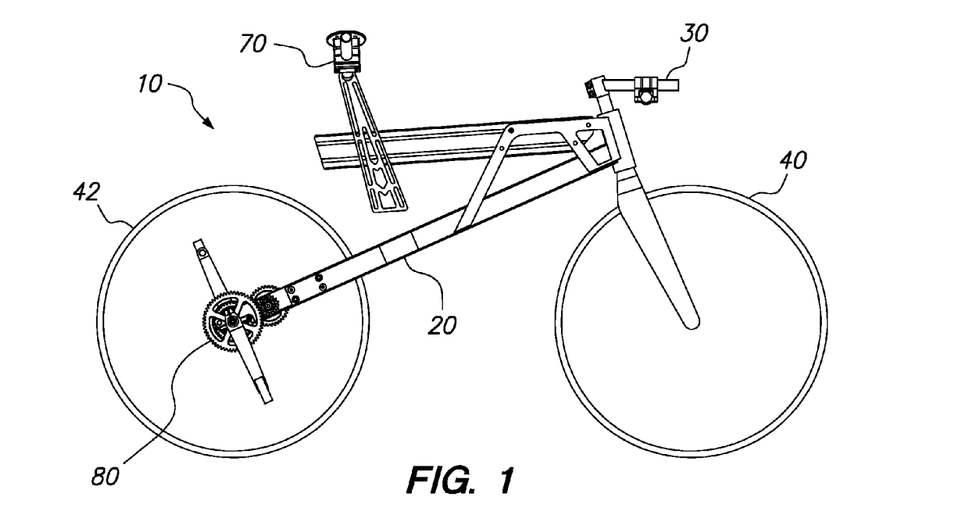
FIG. 1 is a side view of a preferred embodiment of the present invention incorporated into a bicycle.

The descriptive embodiment illustrated in FIG. 1 includes a bicycle 10 for recreational or racing use. It is to be expressly understood that other embodiments other than a road bicycle is covered under the present invention. Also, different components of this descriptive embodiment may have application in other usage as well. For example different components may have applicability in exercise equipment and in other vehicles as well as motorcycles, scooters and motorized vehicles.

OVERVIEW

Bicycle 10 illustrated in FIG. 1 includes frame 20, handlebar system 30, front wheel 40, rear wheel 42, saddle system 60 and drive train 80. These components are integrated into a novel combination to create a more aerodynamic presence of the rider and the bicycle. The drive train of the bicycle is designed so that the rider engages it at the rear hub of the bicycle. The rider is mounted on the bicycle in a forward substantially prone position rather than the upright position of most bicycles today. This provides a substantially improved aerodynamic that greatly decreases the wind resistance on the rider and bicycle to improve the performance of the rider. Not only is the drag from the airflow around the bicycle and rider lessened, the power stroke of the rider is increased as well. These features are accomplished not only by the combination of the novel features of the bicycle of the present invention but by the individual components that add unique improvements to the bicycle.

PREFERRED EMBODIMENTS

Figure 2:
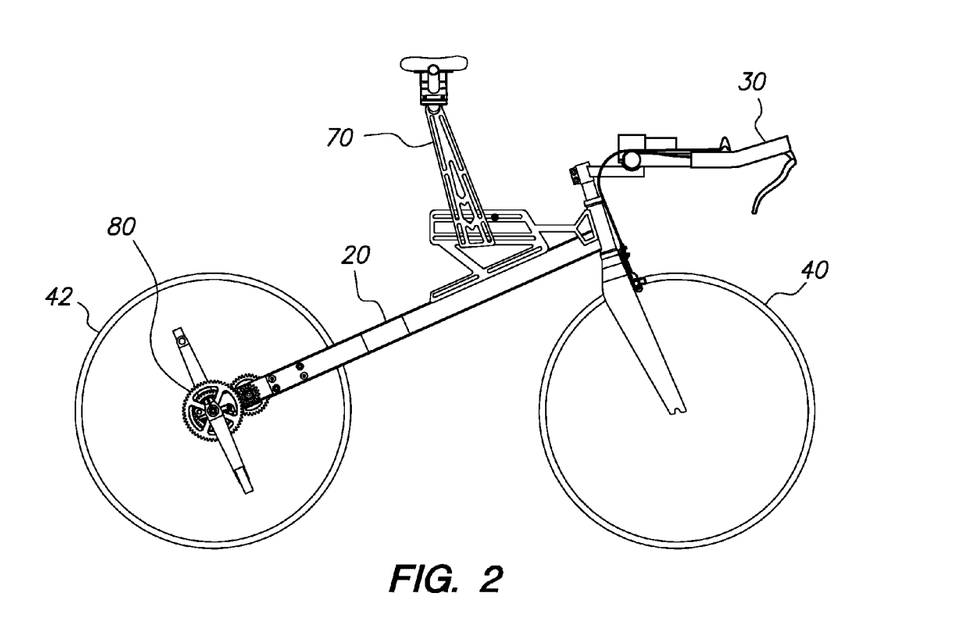
FIG. 2 is a rear perspective view of the frame of the embodiment of FIG. 1.
Figure 3:
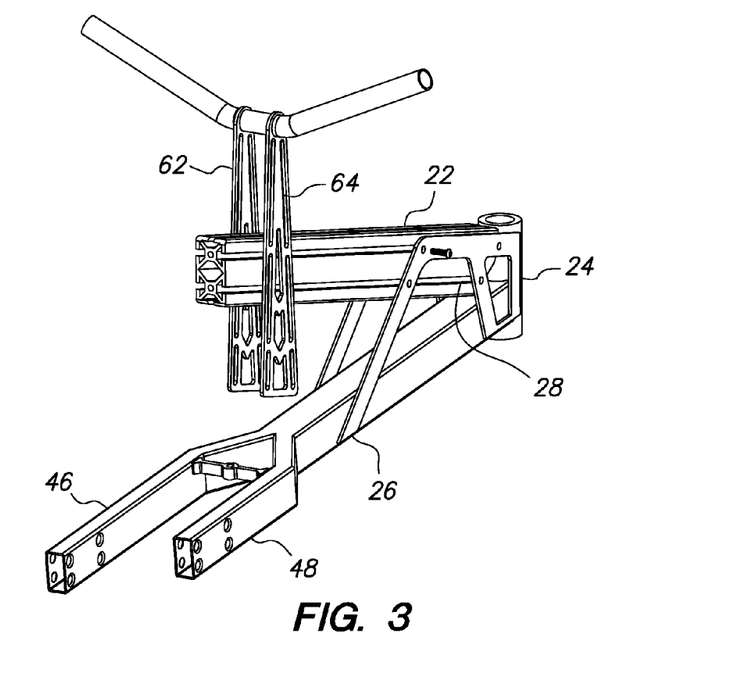
FIG. 3 is a rear perspective view of the frame only.

The frame 20 of the bicycle 10 of a preferred embodiment of the present invention as shown in FIGS. 1-3 includes top tube 22, head tube 24, and a single, unitary down tube 26. The top tube 22, in this embodiment is cantilevered from the head tube 24 and down tube 26. It is to be expressly understood that other frame designs may be used as well, such as and without limitation, securing the top tube by vertical supports at the distal end onto the down tube 26. The top tube 22, in this embodiment, includes one or more slots 28 extending horizontally along the top tube for adjustment of the saddle post 52 as discussed in greater detail below. Additional slots may be formed in the unitary down tube 26, as shown in FIG. 2. In this embodiment, the top tube 22 is formed in the shape of a rectangular beam, but could be formed in a round tube as well. The top tube may also be essentially a bracket extending horizontally as shown in FIG. 2. The top tube 22 may be secured to the head tube and unitary down tube 26 by brackets 28, or by welding, brazing, molding, butting or any other technique.

Figure 4:
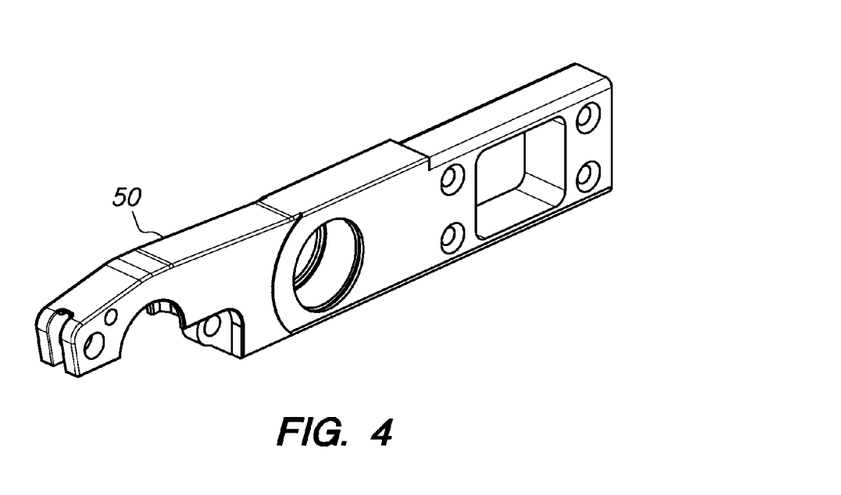
FIG. 4 is a perspective view of a first embodiment of the seat system.

The down tube 26 includes a single tube portion 44 extending from the head tube 24 and extending into parallel forks 46, 48 at the distal end for mounting of the rear wheel 42. Dropouts 50, 52 are mounted into slots at the end of the forks 46, 48. The dropouts may also be manufactured as part of the forks as well. The rear wheel 42 and drive train 80 (discussed in greater detail below) is mounted via the dropouts 50, 52 to the parallel forks 46, 48 as shown in FIGS. 3 and 4. Rear brakes (not shown) are mounted via rear brake attachment 56. The rear wheel 42 is conventional except to the extent that the hub is modified as described in greater detail below.

The handlebar system 30 is secured to the head tube 24 in a conventional manner to allow directional steering of the front wheel 40. The handlebar system 30 includes conventional handlebars 32. Other handlebars may be used as well as discussed in greater detail below. Conventional braking systems (not shown) are attached to the front forks 44 and handlebar 32. The front wheel 40 is conventional and not described in further detail.

The saddle post 52 is mounted to the top tube 22, preferably in a manner that allows adjustment vertically and horizontally. In the embodiments shown in FIGS. 1 and 2, the saddle post 52 includes one or more slots 64. Bolts 66 secure the saddle post 52 through these slots 64 and into slots 28 on the top tube 22. This allows the saddle post 52 to be positioned along a horizontal axis as well as vertically adjusted, then securely affixed in position. The unique saddle system 70, as described below, supports the pelvic region of the rider so that the rider can engage the unique drive train 80 mounted on the rear region of the bicycle as discussed in greater detail below.

Saddle Embodiments

Figure 5:
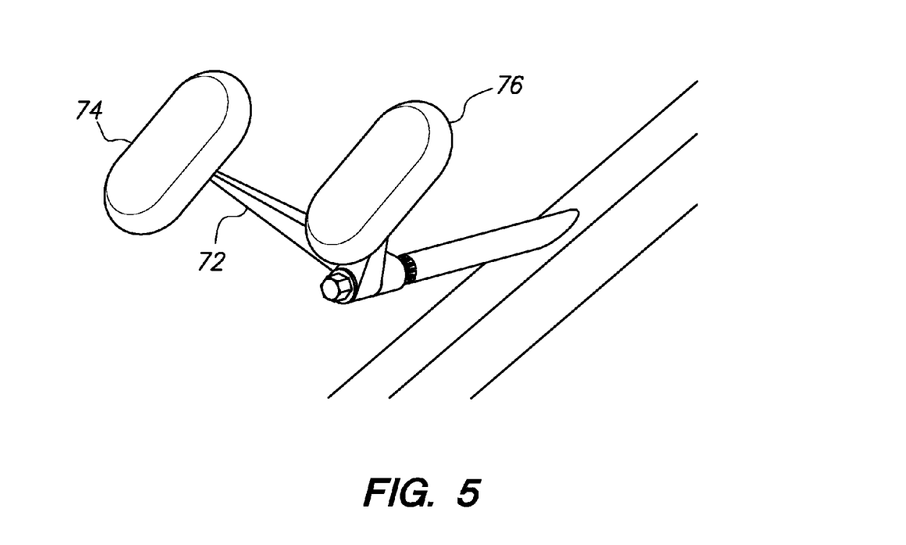
FIG. 5 is a view of the adjustability of the seat system.
Figure 6:
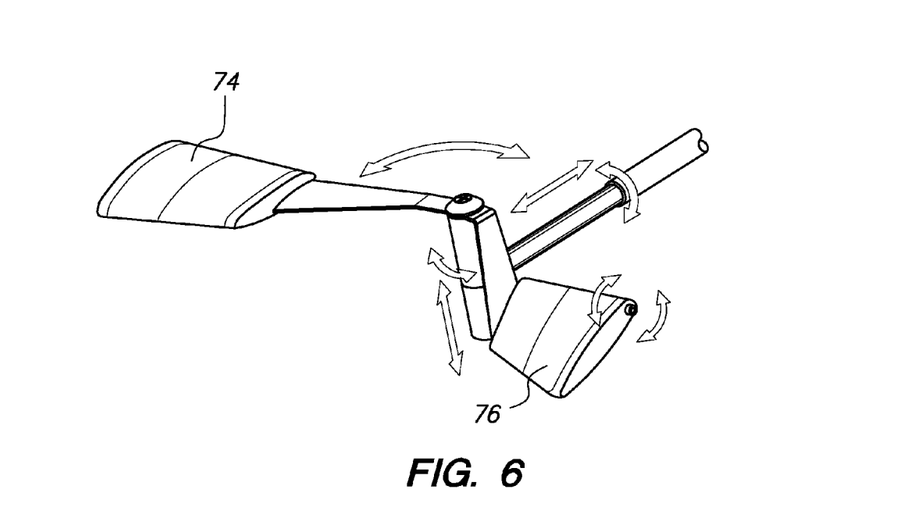
FIG. 6 is a view of the pads of the seat system.

The saddle system 70, as shown in FIGS. 4-6 includes a support bar 72 that extends angularly along an axis transverse to the seat post 62. A pair of spaced pads 74, 76 are mounted onto the support bar 74. The pads 74, 76 are spaced apart to support the anterior pelvic region of the rider. The pads 74, 76 can be adjusted along the support bar 72 for different riders, as well as rotated angularly for adjustment purposes as well. The pads are adjusted so that the anterior pelvic is supported, yet there is sufficient clearance for the thighs as the rider engages the drive train as discussed below.

Figure 7:
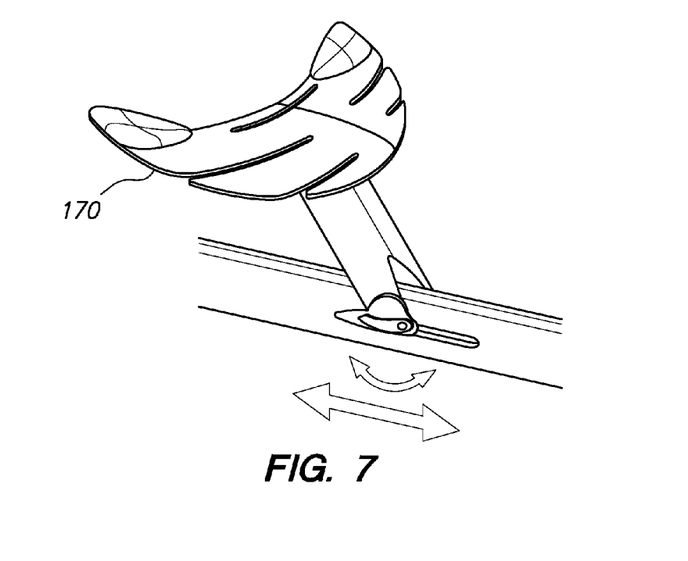
FIG. 7 is a perspective view of a second embodiment of the seat system.

Another embodiment of the seat saddle system is illustrated in FIG. 7. The saddle 170 of this embodiment uses a flexible plastic material mounted directly onto the saddle post to support the anterior pelvic region of the rider. The saddle may also include slots 172 to provide additional flexure along with contours along the lower region to provide clearance for movement of the thighs of the rider.

Figure 8:
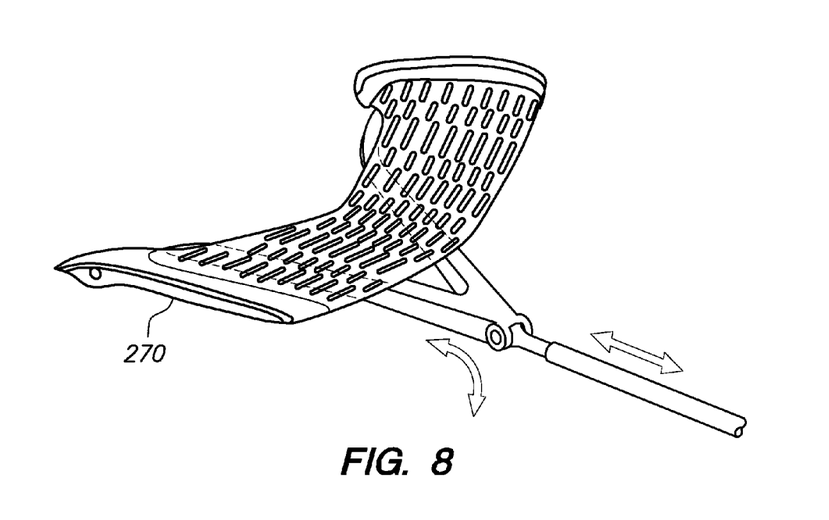
FIG. 8 is a perspective view of a third embodiment of the seat system.

Another similar embodiment is illustrated in FIG. 8. The saddle 270 is formed of a flexible material, such as thin plastic, with a plurality of apertures 272 formed through out the surface. Additional padding 174 may be provided for padding and support of the pelvis of the rider. The lower region 176 is contoured to provide clearance for movement of the thighs of the rider. Other embodiments of saddle are considered within the scope of the invention that provide support for the rider in a forward position on the bicycle.

The saddle may also be formed of a tensioned fabric mounted on a gimbaled arrangement. This allows the saddle to self-position relative to the rider to provide a comfortable support for the rider.

Drive Train Embodiments

Figure 9:
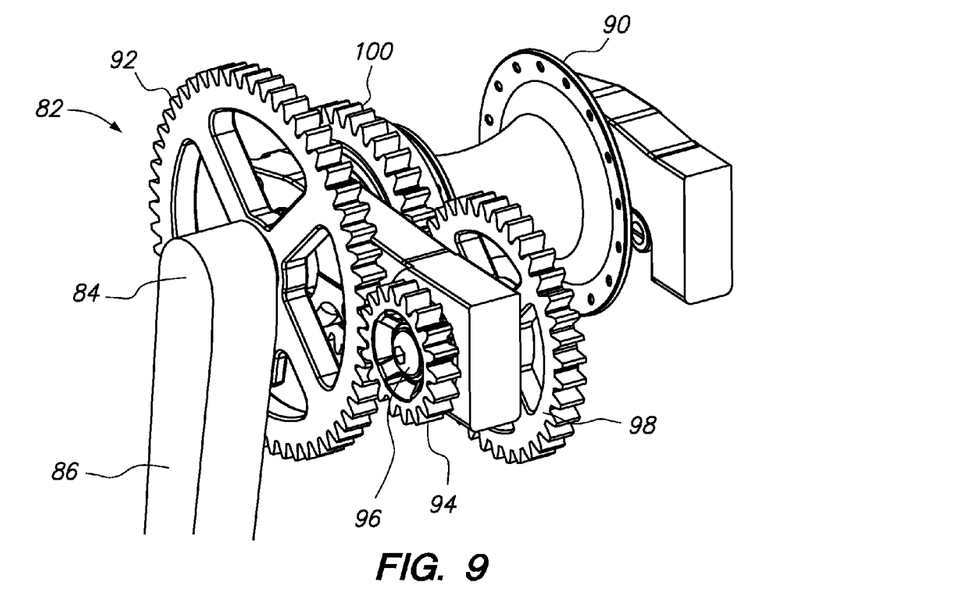
FIG. 9 is a close up view of the direct drive system.

The drive train system 80 is unique to the preferred embodiment of the present invention illustrated in FIGS. 1 and 9. The direct drive system along with the rear wheel hub and wheel is mounted to the down tube via drop-outs 50, 52 shown in FIG. 3 secured in the rear forks. The drive train system of this embodiment uses a direct drive mechanism 82 to transmit the torque from the rider engaging the pedals to the rear wheel. It is to be expressly understood that other embodiments and variations beyond the descriptive embodiments discussed herein are within the scope of the claimed invention. The direct drive mechanism of this embodiment uses a freely rotatable crank spindle 84 having the cranks 86, 88 and pedals mounted thereto. Bearings (not shown) support the crank spindle within the rear wheel hub 90. Crank gear 92 is securely affixed to the crank spindle 84 so to rotate as the crank spindle is rotated by the rider. Idler gear 94 is mounted to a splined shaft 96 rotatably mounted on the dropout 52. On the opposing side of the dropout, gear 98 is mounted on the splined shaft as well so that it rotates as gear 94 rotates. Gear 98 engages hub gear 100 that is securely mounted to the rear wheel hub 90. Thus, as the rider rotates the crank spindle 84 by exerting force on the pedals, gear 92 causes the gear 94 to rotate, causing gear 98 to rotate which rotates gear 100 causing rotation of the rear wheel to propel the bicycle. The ratios of the gears 92, 94, 98, and 100 can be selected to provide the optimum performance and efficiencies.

Figure 10:
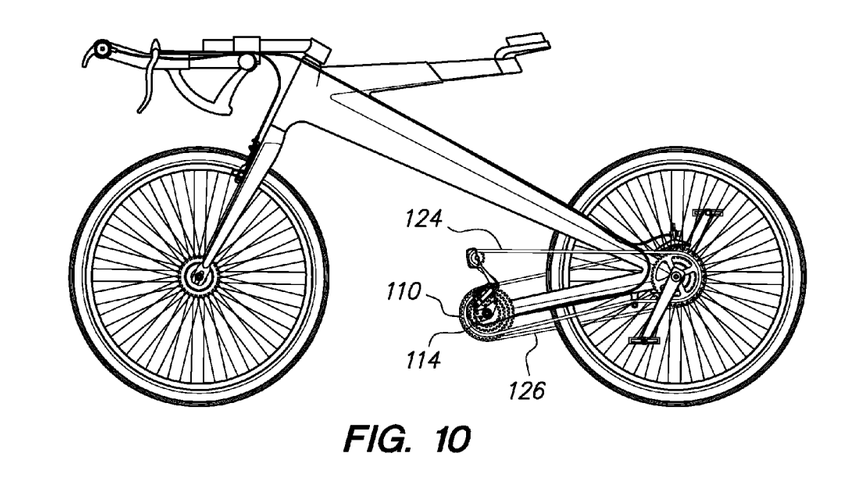
FIG. 10 is a view of the chain drive embodiment.
Figure 11:
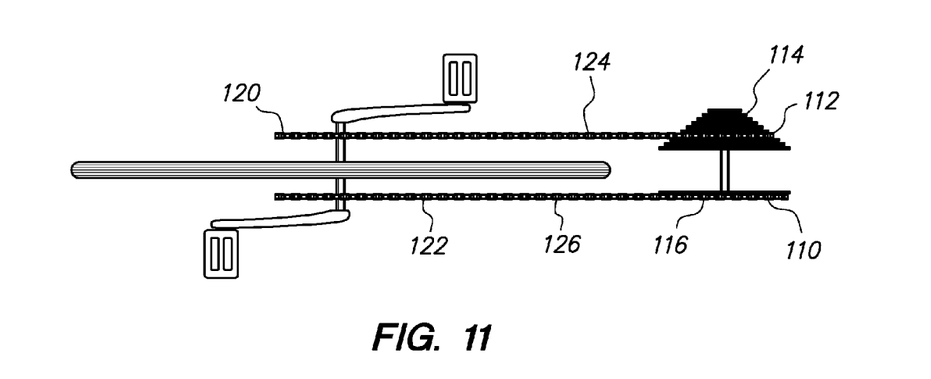
FIG. 11 is a view of the details of the chain drive embodiment.

Another preferred embodiment uses a dual chain drive mechanism as the drive train as shown in FIGS. 10 and 11. This embodiment uses a bicycle frame having a bottom bracket cantilevered from the rear of the forks of the bicycle. Alternatively the bottom bracket can be secured from the down tube of the bicycle. Bottom bracket 110 includes a shaft 112 mounted by bearings for rotation in the bottom bracket. A chain cluster freewheel 114 is mounted on one end of the shaft 112 with a chain gear 116 on the opposing side. A derailleur 118 is mounted next to the chain cluster freewheel with operating cable extending to a gear shift mechanism on the handlebar system. Chain gear 120 is mounted on the crankshaft extending through the hub of the rear wheel while chain gear 122 is mounted onto the rear hub. Chain 124 links gear 120 to the chain cluster freewheel 114 while chain 126 links gear 116 to gear 122. As the rider pedals, the torque is transferred from the gear 120 mounted on the crank to the cluster freewheel 114. The torque is then transferred via the shaft 112 to gear 116 which then transfers the torque to the gear 122 driving the hub and rear wheel. Different gear ratios can be achieved in regard to the cluster freewheel by shifting the derailleur to different gears on the cluster.

Figure 12:
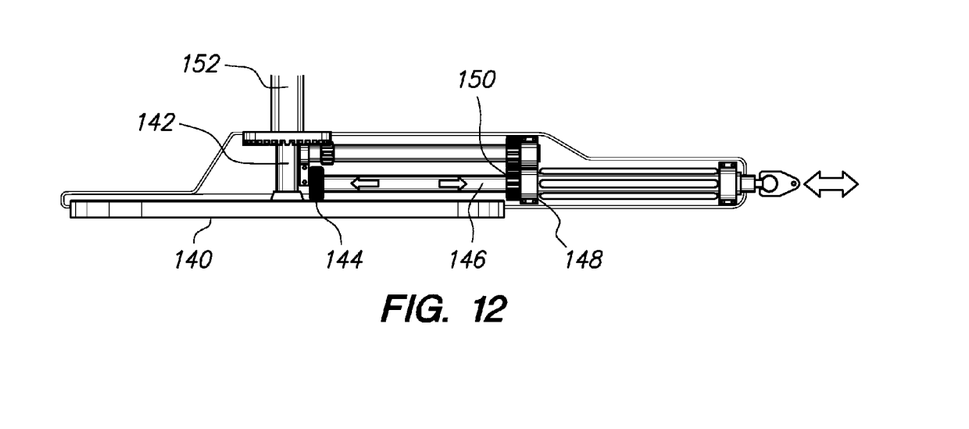
FIG. 12 is a view of the interplanetary gear drive system.

Another embodiment of a drive train can include a planetary gear mechanism, such as the one illustrated in FIG. 12. This drive train includes a gear wheel 140 having radially extending teeth. The gear wheel is secured to the crankshaft 142 driven by the rider. Pinion gear 144 engages the radial teeth of the gear wheel 140. This gear is secured to a rotatable shaft 146 onto which gear 148 is rotatably secured while allowed to move longitudinally relative to the shaft. Gear 148 engages gear 150 mounted on rotatable shaft 152 onto which gear 150 is mounted. Gear 150 engages drive shaft 152 mounted onto the hub of the rear wheel. Rotation of the crank by the rider causes the gears to interact to transfer torque to the rear wheel. Shaft 144 may be moved relative to the gear wheel 140 to move pinion gear relative to the gear wheel. This adjusts the gear ratio and speed of the bicycle. Other embodiments of drive trains may be used as well within the scope of the claimed inventions.

Use

In operation, the rider mounts the bicycle so that the anterior pelvic region of the rider is supported by pads 134, 136 of the saddle 70. The feet of the rider are mounted onto the pedals on the cranks 96, 98. The hands and/or arms of the rider engage the handlebar system of the bicycle. The rider is thus supported in a forward leaning position on the bicycle instead of the normal upright or crouched position of prior bicycles. This provides a streamlined position and decreases the aerodynamic drag on the rider during use of the bicycle. The legs of the rider are at an incline and are able to more fully extend. Further the power of the stroke is generated by the entire core of the rider, including the shoulders, back and abdomen as well as the legs of the rider. This provides a much greater power stroke than in the previous style of bicycles.

Figure 13:
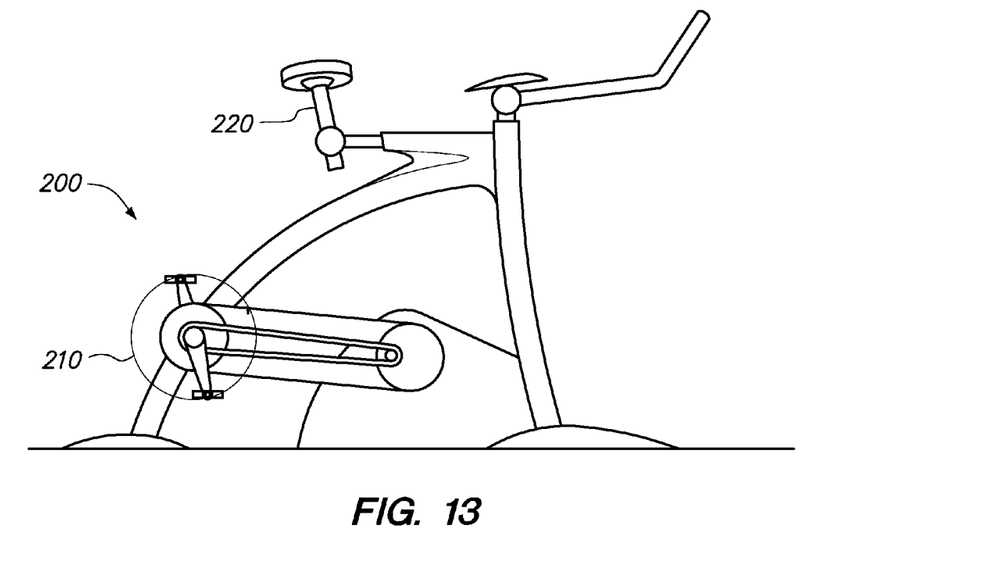
FIG. 13 is a view of an exercise equipment embodiment.

In another preferred embodiment, the drive mechanism and saddle is incorporated into an exercise device. A descriptive embodiment of such a device is illustrated in FIG. 13. It is to be expressly understood that the illustrative embodiment is intended for explanatory purposes only and is not meant to limit the scope of the claims. This preferred embodiment may take many different shapes and configurations. The illustrative exercise device 200 is somewhat similar to existing stationary bicycles found in many health clubs and homes. The exercise device 200 of this embodiment includes a frame-housing an adjustable load mechanism 204 with a front support housing a display. This particular embodiment however also includes a rear mounted pedal system 210 with an anterior pelvic support system 220. The anterior pelvic support system 220 includes parallel spaced pads. The user mounts the exercise device 200 by placing their feet on the rear mounted pedal system 210 and supporting their front pelvic region on the pads. An adjustment mechanism (not shown) may be used to slide the pads fore and aft as well as vertically to provide a proper fit.

The use of the rear mounted pedals to transfer power from the user to the load mechanism 204 along with the anterior pelvic support enables a much fuller body workout to be achieved. Not only are the legs of the user being worked, but the trunk and core of the body of the user also achieves a workout.

Figure 14:
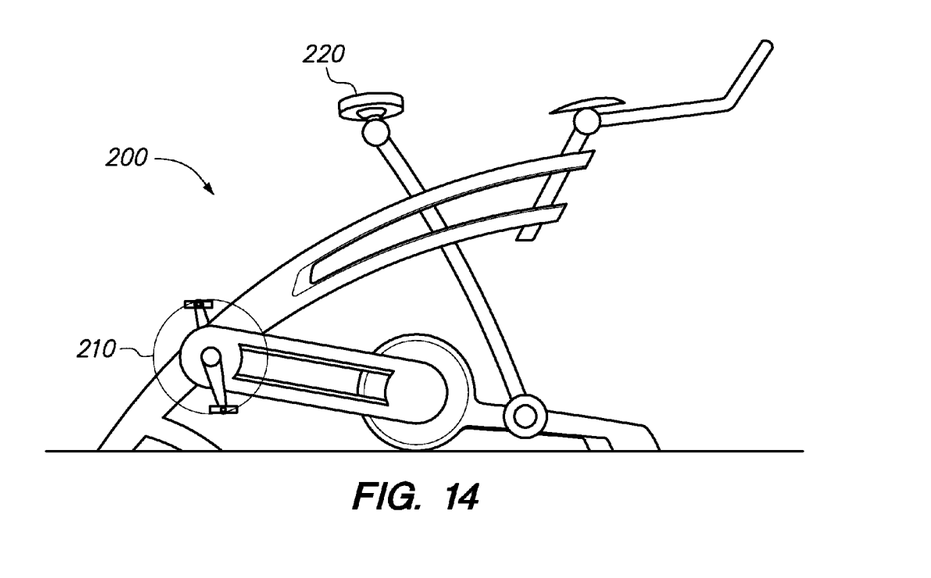
FIG. 14 is a view of a second exercise equipment embodiment.

An alternative embodiment illustrated in FIG. 14 allows the front handlebar system to pivot relative to the rear mounted pedal system. This allows the user to provide additional movements during the use for their upper body.

Another embodiment of the present invention utilizes the anterior pelvic support saddle on motorized bicycles. For example, the saddle may be incorporated into a motorcycle, such as a road motorcycle or even a motocross or enduro style motorcycle. The user would be supported on rear foot pegs and on the anterior pelvic support saddle. This provides a more streamlined and aerodynamic riding position for the rider. This position also provides more efficient support, as opposed to the upright position typical of most riders. That position can create health problems as well as discomfort over time.

Other examples of use of the different components of the present invention includes use on scooters, or on almost any type of device that typical requires the user in a seated position. The benefits of the present invention range from providing a more aerodynamic position, to utilizing most if not all of the body to transfer power to the device.

What is claimed is:

1. A bicycle, said bicycle comprising:
   a frame comprising a top tube, a head tube, and a unitary down tube where said top tube and said down tube meet at said head tube to form a V-shape and where said top tube is cantilevered from said head tube;
   a rear wheel assembly mounted to rear end of said frame;
   a hub extending through the center of said rear wheel assembly;
   a crank extending through said hub;
   pedals mounted on said crank wherein a rider applies pressure to said pedals to drive said rear wheel assembly;
   a single saddle post attached to said frame; and
   a saddle attached to said saddle post where said saddle supports an anterior pelvic region of the rider during operation of the bicycle.

2. The bicycle of claim 1 wherein said bicycle further includes:
   a bottom bracket at a mid portion of said frame;
   a rotatable spindle extending through said bottom bracket;
   a first chain extending from said crank to said spindle on one side of said frame to rotate said spindle as pressure is applied to said pedals; and
   a second chain extending from said spindle to said rear wheel assembly to transfer power from said spindle to said rear wheel.

3. The bicycle of claim 1 wherein said bicycle further includes:
   a gear drive mechanism on said rear wheel assembly connected to said crank.

4. The bicycle of claim 1 wherein said bicycle further includes:
   an interplanetary drive mechanism on said rear wheel assembly connected to said crank.

5. The bicycle of claim 1 wherein said bicycle further includes:
   a bottom bracket at a mid portion of said frame;
   a rotatable spindle extending through said bottom bracket;
   a plurality of chain rings on said rotatable spindle;
   a first chain extending from said crank to said spindle on one side of said frame to rotate said spindle as pressure is applied to said pedals;
   a second chain extending from one of said chain rings on said spindle to said rear wheel assembly to transfer power from said spindle to said rear wheel; and
   a derailleur mechanism mounted on said frame adjacent said second chain to shift said second chain between said chain rings.

6. The bicycle of claim 1 wherein said saddle further includes:
   at least one pad.

7. The bicycle of claim 1 wherein said saddle includes:
   at least two pads spaced from one another.

8. The bicycle of claim 1 wherein said saddle includes:
   a flexible member to provide support to the anterior pelvic region of the rider.

9. The bicycle of claim 1 wherein said saddle includes:
   a tensioned fabric to provide support to the anterior pelvic region of the rider.

10. The bicycle of claim 1 wherein said saddle includes:
    a gimbaled mechanism.

11. The bicycle of claim 1 wherein said saddle includes:
    an adjustment mechanism to adjust the position of said saddle.

12. The bicycle of claim 1 wherein said bicycle is an exercise device for stationary use.

13. A saddle assembly for use on a cycle comprising:
    an attachably secureable assembly fitting onto a cycle frame where said frame comprises
    a top tube,
    a head tube,
    a unitary down tube where said top tube and said down tube meet at said head tube to form a V-shape and where said top tube is cantilevered from said head tube; and
    where said saddle assembly is attachably secured to said cantilevered top tube;
    a saddle on a saddle post for supporting an anterior pelvic region of a user; and
    a foot support mounted on rear portion of the cycle so that the user extends forwardly over the cycle having their anterior pelvic region supported by said saddle.

14. The bicycle of claim 13 wherein said saddle includes:
    a flexible member to provide support to the anterior pelvic region of the rider.

15. The bicycle of claim 13 wherein said saddle includes:
    a tensioned fabric to provide support to the anterior pelvic region of the rider.

16. The bicycle of claim 13 wherein said saddle includes:
    a gimbaled mechanism.

17. The bicycle of claim 13 wherein said saddle includes:
    an adjustment mechanism to adjust the position of said saddle.

18. The seat assembly of claim 13 wherein said saddle includes at least two pads spaced from one another on said seat post.

19. The seat assembly of claim 13 wherein said foot support includes:
    a rear wheel assembly mounted to rear end of said cycle frame;
    a crank extending through said rear wheel assembly; and
    pedals mounted on said crank wherein the rider applies pressure to said pedals to drive said rear wheel assembly.

20. The seat assembly of claim 13 wherein said seat assembly further comprises:
    a bicycle.

21. The seat assembly of claim 13 wherein said seat assembly further comprises:
    an exercise device for stationary use.

22. The seat assembly of claim 13 wherein said seat assembly further comprises:
    a scooter.

23. The seat assembly of claim 13 wherein said seat assembly further comprises:
    a motorcycle.

* * * * *